(12) United States Patent
Kumashiro et al.

(10) Patent No.: US 7,840,957 B2
(45) Date of Patent: Nov. 23, 2010

(54) COMPUTER PROGRAM AND APPARATUS FOR UPDATING INSTALLED SOFTWARE PROGRAMS BY COMPARING UPDATE TIMES

(75) Inventors: Junji Kumashiro, Kawasaki (JP); Hiroshi Nonaka, Kawasaki (JP); Akira Kumeta, Kawasaki (JP); Yukiya Ishioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1050 days.

(21) Appl. No.: 11/594,612

(22) Filed: Nov. 8, 2006

(65) Prior Publication Data
US 2007/0294684 A1  Dec. 20, 2007

(30) Foreign Application Priority Data
Jun. 15, 2006  (JP)  ............................. 2006-165729

(51) Int. Cl.
G06F 9/44 (2006.01)
(52) U.S. Cl. ..................... 717/173; 717/168; 717/171; 717/172
(58) Field of Classification Search .......... 717/168–178
See application file for complete search history.

(56) References Cited

U.S. PATENT DOCUMENTS

| | | | | |
|---|---|---|---|---|
| 5,805,898 A | * | 9/1998 | Barsness et al. | 717/175 |
| 5,909,581 A | * | 6/1999 | Park | 717/170 |
| 5,960,206 A | * | 9/1999 | Barsness et al. | 717/174 |
| 6,052,531 A | * | 4/2000 | Waldin et al. | 717/170 |
| 6,289,511 B1 | * | 9/2001 | Hubinette | 717/173 |
| 6,302,795 B1 | * | 10/2001 | Ito | 463/29 |
| 6,438,750 B1 | * | 8/2002 | Anderson | 717/178 |
| 6,651,249 B2 | * | 11/2003 | Waldin et al. | 717/170 |
| 6,678,888 B1 | * | 1/2004 | Sakanishi | 717/172 |
| 6,721,612 B2 | * | 4/2004 | Aramaki et al. | 700/87 |
| 7,185,332 B1 | * | 2/2007 | Waldin et al. | 717/170 |
| 7,694,292 B2 | * | 4/2010 | Mueller et al. | 717/170 |
| 7,765,535 B2 | * | 7/2010 | Haraguchi et al. | 717/158 |
| 2003/0177485 A1 | * | 9/2003 | Waldin et al. | 717/169 |

(Continued)

FOREIGN PATENT DOCUMENTS

JP  10-260820  9/1998

OTHER PUBLICATIONS

Potter et al., "Reducing downtime due to system maintenance and upgrades," 2005, USENIX Association, p. 1-4.*

Primary Examiner—Wei Y Zhen
Assistant Examiner—Qing Chen
(74) Attorney, Agent, or Firm—Greer, Burns & Crain, Ltd.

(57) ABSTRACT

A computer program and apparatus that minimize the time required to update installed programs to a new version. Upon receipt of a request for updating old version software to a new version, a version information collector first obtains version information describing specified new version software. Then a processing time calculator calculates update processing times for a full update process, a partial update process, and a copy & update process, based on the obtained version information about the new version software, as well as based on version information describing the old version software. A process selector compares the calculated update processing times and selects the fastest update process. Then an updating unit executes the selected fastest update process to update the old version software to the new version software.

20 Claims, 13 Drawing Sheets

U.S. PATENT DOCUMENTS

2003/0233649 A1* 12/2003 Reimert ...................... 717/176
2004/0172628 A1* 9/2004 Aramaki et al. ............. 717/176
2006/0123414 A1* 6/2006 Fors et al. ................... 717/177
2006/0200703 A1* 9/2006 Mueller et al. ................ 714/38
2007/0261050 A1* 11/2007 Nakano et al. .............. 717/172

* cited by examiner

FIG. 8

OVERALL SYSTEM INFORMATION 401

| SYSTEM GENERATIONS | 4 |
|---|---|
| COMPONENTS | 3 |

AREA-SPECIFIC INFORMATION 402

| SYSTEM AREA Sd | SYSTEM VERSION | COMPONENT ID | VERSION | SIZE |
|---|---|---|---|---|
| | 6 | Ca | 1 | 100 KB |
| | | Cb | 2 | 110 KB |
| | | Cc | 5 | 130 KB |

| SYSTEM AREA Sc | SYSTEM VERSION | COMPONENT ID | VERSION | SIZE |
|---|---|---|---|---|
| | 5 | Ca | 1 | 100 KB |
| | | Cb | 2 | 110 KB |
| | | Cc | 4 | 120 KB |

| SYSTEM AREA Sb | SYSTEM VERSION | COMPONENT ID | VERSION | SIZE |
|---|---|---|---|---|
| | 4 | Ca | 1 | 100 KB |
| | | Cb | 1 | 100 KB |
| | | Cc | 4 | 120 KB |

| SYSTEM AREA Sa | SYSTEM VERSION | COMPONENT ID | VERSION | SIZE |
|---|---|---|---|---|
| | 3 | Ca | 1 | 100 KB |
| | | Cb | 1 | 100 KB |
| | | Cc | 3 | 120 KB |

| | | | |
|---|---|---|---|
| 411 — TRANSFER TIME PARAMETER | DATA TRANSFER TIME PER UNIT SIZE | ** s/MB |
| 412 — REWRITE TIME PARAMETERS | DATA REWRITE TIME PER UNIT SIZE | 2.5 s/MB |
| | TIME OVERHEAD (TIME FOR PREPARATION) | 1.0 s |
| 413 — COPY TIME PARAMETER | DATA COPY TIME PER UNIT SIZE | 0.2 s/MB |

FIG. 9

OVERALL SYSTEM INFORMATION 421

| SYSTEM GENERATIONS | 7 |
|---|---|
| MANAGED SYSTEMS | 7 |
| COMPONENTS | 3 |

VERSION-SPECIFIC INFORMATION 422

| SYSTEM VERSION | COMPONENT ID | VERSION | SIZE |
|---|---|---|---|
| 7 | Ca | 1 | 100 KB |
|   | Cb | 2 | 110 KB |
|   | Cc | 6 | 150 KB |

| SYSTEM VERSION | COMPONENT ID | VERSION | SIZE |
|---|---|---|---|
| 6 | Ca | 1 | 100 KB |
|   | Cb | 2 | 110 KB |
|   | Cc | 5 | 130 KB |

| SYSTEM VERSION | COMPONENT ID | VERSION | SIZE |
|---|---|---|---|
| 5 | Ca | 1 | 100 KB |
|   | Cb | 1 | 100 KB |
|   | Cc | 5 | 130 KB |

| SYSTEM VERSION | COMPONENT ID | VERSION | SIZE |
|---|---|---|---|
| 4 | Ca | 1 | 100 KB |
|   | Cb | 1 | 100 KB |
|   | Cc | 4 | 120 KB |

| SYSTEM VERSION | COMPONENT ID | VERSION | SIZE |
|---|---|---|---|
| 3 | Ca | 1 | 100 KB |
|   | Cb | 1 | 100 KB |
|   | Cc | 3 | 120 KB |

| SYSTEM VERSION | COMPONENT ID | VERSION | SIZE |
|---|---|---|---|
| 2 | Ca | 1 | 100 KB |
|   | Cb | 1 | 100 KB |
|   | Cc | 2 | 110 KB |

| SYSTEM VERSION | COMPONENT ID | VERSION | SIZE |
|---|---|---|---|
| 1 | Ca | 1 | 100 KB |
|   | Cb | 1 | 100 KB |
|   | Cc | 1 | 100 KB |

FIG. 10

CLIENT PROCESS FLOW

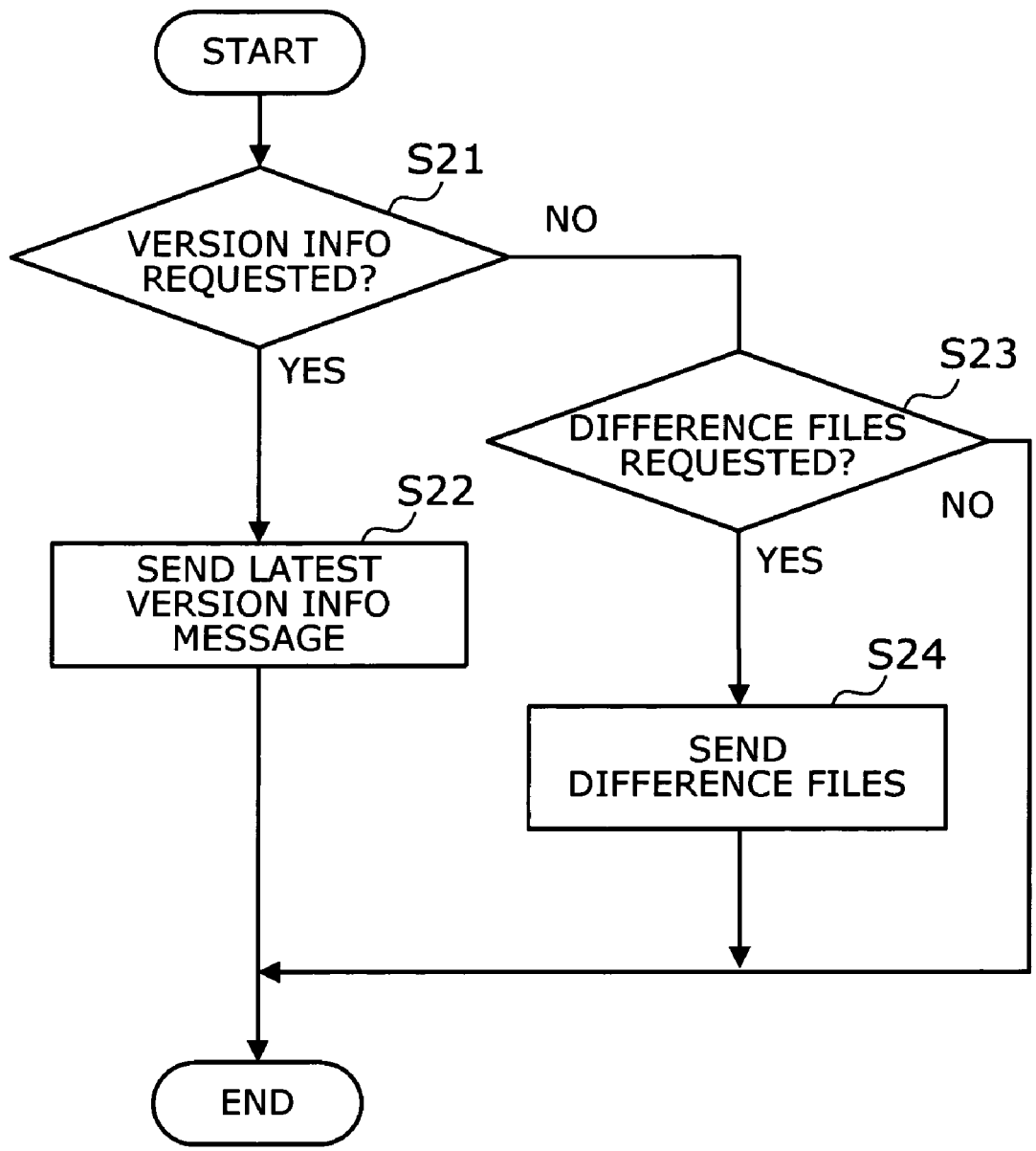

COMPUTER PROGRAM AND APPARATUS FOR UPDATING INSTALLED SOFTWARE PROGRAMS BY COMPARING UPDATE TIMES

CROSS-REFERENCE TO RELATED APPLICATIONS

This application is based upon and claims the benefits of priority from the prior Japanese Patent Application No. 2006-165729 filed Jun. 15, 2006, the entire contents of which are incorporated herein by reference.

BACKGROUND OF THE INVENTION

1. Field of the Invention

The present invention relates to a computer program and apparatus for updating installed software, and more particularly to a computer program and apparatus for use in an information processing device to update installed software programs to a specified new version.

2. Description of the Related Art

Information processing devices operate with various software programs installed on them to provide specific processing functions. Those programs are updated or upgraded to a new version from time to time as necessary. The user of an information processing device installs a new version of software to solve software-related problems, if any, or add a desired function to his/her device. One way of doing this is to replace the entire software files with those of a new version. This update method is referred to herein as "full update." Another way is to install only a fraction of the software files that differ from an existing old version. This method is referred to herein as "partial update." Software update kits are made available for installation in either of those two ways.

The full update method may not be efficient since it generally involves a complete rewrite of large amounts of data including unchanged files, which do not really need update. By contrast, the partial update method only updates revised files, thus reducing the amount of data to be rewritten. One drawback of this partial update method is that the user has to apply multiple sets of difference files in the case where the currently installed version is several generations older than the desired new version. Suppose, for example, that the current software needs an update from version 1 to version 3. The user has first to install a set of difference files to update the version-1 software to version 2. Then he/she installs another set of difference files to update the version-2 software to version 3. Repeating incremental updates in this way is complicated and burdensome.

To alleviate the above-described drawback of conventional update methods, there is proposed a software installer that produces difference files for each revision step and determines a combination of difference files required to update a specific old version to a specific new version. See, for example, Japanese Unexamined Patent Application Publication No. 10-260820 (1998). This method, however, is not always an optimal solution in terms of total update processing time.

As mentioned earlier, the partial update method is advantageous, on one hand, over the full update method since it can perform an update with a smaller amount of write data. The partial update method, on the other hand, has to determine or seek the write address of each individual difference file. It also takes time to combine or divide difference files. For this reason, the update processing time of a partial update process could be longer than expected, in the case where the update includes a large number of program components that should be replaced. The full update method is free from this kind of overhead. It is sometimes faster than partial update, depending on the number of revised components, the data size of difference files, network bandwidth, computer performance, and the like. Conventional software update tools, however, are unable to choose an appropriate method in terms of total update processing time.

Some types of information processing devices, such as car navigation system stations and mobile phones, operate with a plurality of software versions installed therein. This kind of device needs to switch its software functions depending on the purpose and thus has to maintain two or more versions of the same software program, updating them independently. When updating the existing oldest version to the latest one, the device downloads every necessary difference file from a management server, regardless of whether some of those difference files exist in the storage areas of other versions. As a result, the device downloads a large amount of difference files from a management server and thus consumes a long time to apply them to the oldest version.

SUMMARY OF THE INVENTION

In view of the foregoing, it is an object of the present invention to provide a computer program and apparatus that minimize the time required to update installed programs to a new version.

To accomplish the above object, the present invention provides an apparatus for updating installed software. This apparatus has a software storage unit storing different versions of software, including old version software to be updated and intermediate version software that is newer than the old version software. When an update of the old version software to a specific new version is requested, a version information collector obtains version information describing the specified new version software, and a processing time calculator calculates a full update time, a partial update time, and a copy & update time, based on the obtained version information describing the new version software and version information describing the old version software. Here, the full update time is a time required for a full update process that rewrites the old version software entirely with the new version software. The partial update time is a time required for a partial update process that updates the old version software by using a first set of difference files. The copy & update time is a time required for a copy & update process that first copies the intermediate version software to a storage area accommodating the old version software and then updates the copied intermediate version software to the new version software by using a second set of difference files. Then, by comparing the calculated full update time, partial update time, and copy & update time, a process selector selects the fastest update process from among the full update process, partial update process, and copy & update process. An updating unit executes the selected fastest update process to update the old version software to the new version software.

Also, to accomplish the above object, the present invention provides a computer-readable medium storing a computer program for use by a computer to update installed software. The computer has a software storage unit storing different versions of software, including old version software to be updated and intermediate version software that is newer than the old version software. The computer program causes the computer to function as the following elements: a version information collector, a processing time calculator, a process selector, and an updating unit. The version information collector obtains version information describing specified new version software. The processing time calculator calculates a full update time, a partial update time, and a copy & update time, based on the obtained version information describing the new version software and the version information describing the old version software. Here, the full update time is a time required for a full update process that rewrites the old version software entirely with the new version software. The partial update time is a time required for a partial update process that updates the old version software by using a first set of difference files. The copy & update time is a time required for a copy & update process that first copies the intermediate version software to a storage area accommodating the old version software and then updates the copied intermediate version software to the new version software by using a second set of difference files. By comparing the calculated full update time, partial update time, and copy & update time, the process selector selects the fastest update process from among the full update process, partial update process, and copy & update process. Finally, the updating unit executes the selected fastest update process to update the old version software to the new version software.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 shows an example of management data maintained in a client according to the present embodiment.

FIG. 9 shows an example of time parameters maintained in a client according to the present embodiment.

FIG. 10 shows an example of version management data maintained in a management server according to the present embodiment.

FIG. 13 is a flowchart of update processing performed by a management server according to the present embodiment.

DESCRIPTION OF THE PREFERRED EMBODIMENTS

Figure 1:
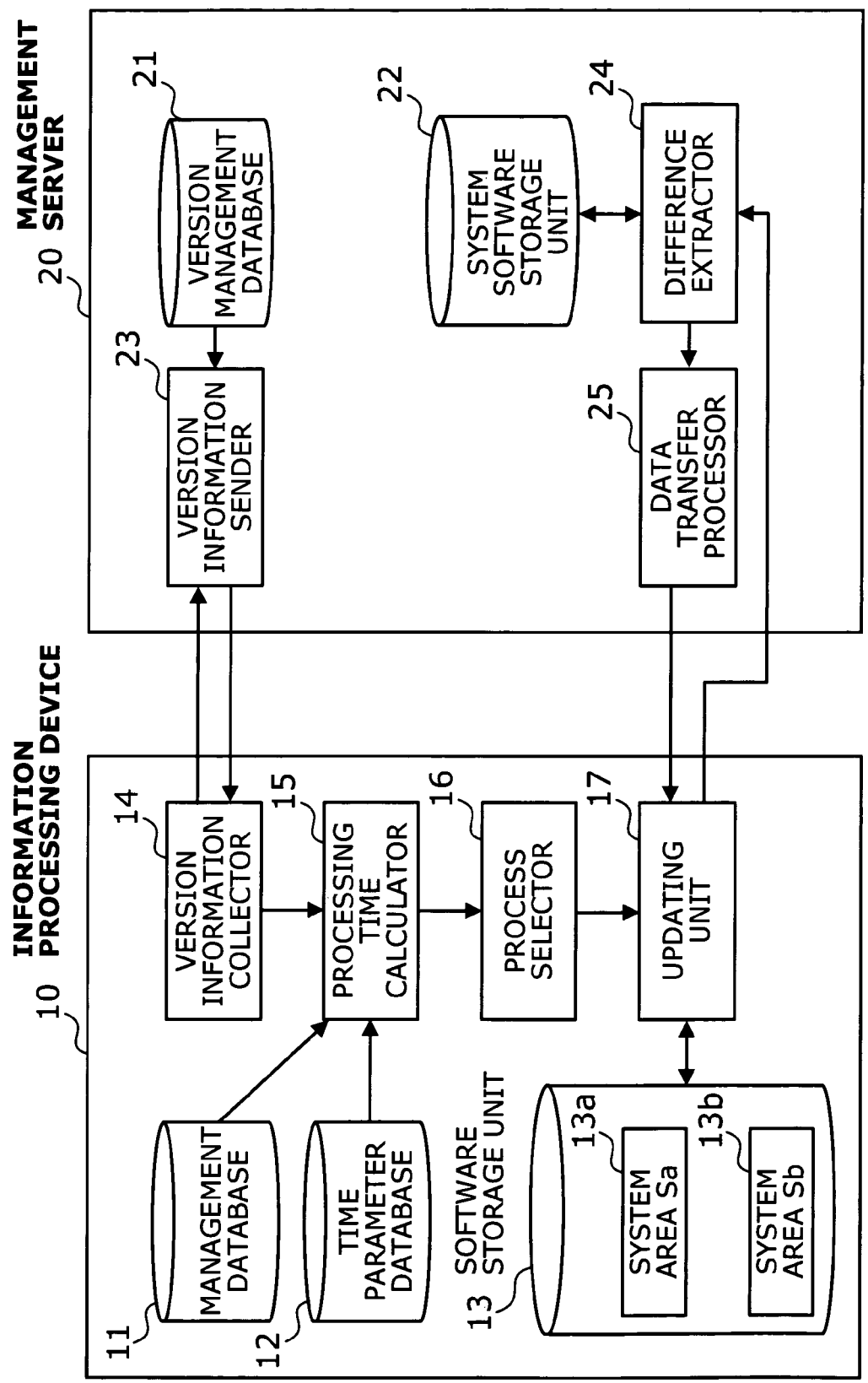
FIG. 1 shows the concept of a system in which the present invention is embodied.

Preferred embodiments of the present invention will be described below with reference to the accompanying drawings, wherein like reference numerals refer to like elements throughout. The following description begins with an overview of the present invention and then proceeds to a more specific embodiment of the invention.

FIG. 1 shows the concept of a system in which the present invention is embodied. In the illustrated software update system according to the present invention, an information processing device 10 is connected to a management server 20 through a network. The information processing device 10 has the function of updating software programs as necessary. The management server 20 manages a plurality of versions of software programs for use in software update operations.

The information processing device 10 includes, among others, the following elements: a management database 11, a time parameter database 12, and a software storage unit 13. These elements serve as storage of parameters, records, tables, code, programs, or any other data objects, depending on their purposes. The information processing device 10 also includes: a version information collector 14, a processing time calculator 15, a process selector 16, and an updating unit 17. This group of elements performs particular processing functions. Specifically, the information processing device 10 operates on system software programs stored in the software storage unit 13 while selecting an appropriate version according to the circumstances. The system software is a collection of software components, each of which has a unique version number for management purposes. The version number of overall system software is changed each time its components are reorganized or revised.

The management database 11 stores information for the purpose of management of system areas Sa 13*a* and Sb 13*b* allocated in the software storage unit 13. This management information is divided into the following two classes. One is overall system information describing the entire sets of system software installed in the software storage unit 13. The other is area-specific information that gives details of each version of system software stored in different areas of the software storage unit 13. For example, the area-specific system information corresponding to a particular system area includes the version number of system software stored in that area. The area-specific system information also includes more specific version information such as the name, version, and size of each and every component belonging to that system software.

The time parameter database 12 stores time parameters for the processing time calculator 15 to calculate how long it takes to complete an update process. Specifically, this time parameter database 12 contains the following parameters: (a) transfer time parameters for calculating the time required to download update data files from the management server 20, (b) rewrite time parameters for calculating the time required to save the downloaded data files into the software storage unit 13, and (c) copy time parameters for calculating the time required to copy data from one area to another area within the software storage unit 13. More specifically, those time parameters are given in terms of data transfer time per unit size. Transfer time parameters may be determined from, for example, an actual data transfer rate observed in a negotiation session with the management server 20. Or, alternatively, they may be determined from the performance of past downloading operations. Rewrite time parameters include a value of rewrite time per unit size, which gives the speed of data write operation to the software storage unit 13. Rewrite time parameters further include parameters representing a time overhead related to write address search. Copy time parameters are specified in terms of copy time per unit size. The rewrite time parameters and copy time parameters are previously defined depending on the basic performance of each individual information processing device 10.

The software storage unit 13 provides a plurality of memory areas for storing multiple sets of installed system software programs. In the example shown in FIG. 1, there are two areas, system area Sa 13a and system area Sb 13b, to accommodate different versions of system software programs.

The version information collector 14 requests the management server 20 to provide version information describing a specified version of system software when an update command is entered through some input device (not shown). For example, the update command may specify the latest version of system software. If that is the case, the version information collector 14 will request version information about the latest system software. When the requested version information is received from the management server 20, the version information collector 14 forwards it to the processing time calculator 15.

With the provided version information about the specified new version of system software, the processing time calculator 15 calculates update processing times of a full update process, a partial update process, and a copy & update process. For a full update process, the processing time calculator 15 calculates the time required to update the old version software area with the entire data set of the specified new version.

For a partial update process, the processing time calculator 15 calculates the time required to update the old version software area with difference files prepared for the new version. A set of difference files for this purpose is compiled by comparing versions of each component included in both the new and old system software versions, based on their respective version information. More specifically, the difference files are a collection of new system software components whose versions are different from those of the old version components.

For a copy & update process, the processing time calculator 15 first selects an intermediate version of system software from among those stored in the software storage unit 13. The term "intermediate version" refers to a version between two given versions. Since a new version number is assigned to each new set of system software programs, the system with an intermediate version number between two specific version numbers is supposed to bear a closer resemblance to the newer one of the two versions. The processing time calculator 15 then calculates the time required to rewrite the system software area of the old version with the selected intermediate version and further update the content of that area with difference files between the intermediate and new versions. The processing time calculator 15 sends all those calculation results to the process selector 16. The details of update processing time calculation will be described in a later section.

The process selector 16 receives the above-described update processing times of full update, partial update, and copy & update processes from the processing time calculator 15. The process selector 16 compares those values to select an update process with the smallest processing time. That is, the process selector 16 determines the fastest update process.

The updating unit 17 executes the process selected by the process selector 16 to update the intended old version system software area in the software storage unit 13 with the new version system software. More specifically, in the case where a full update process is selected, the updating unit 17 requests the management server 20 to provide all files belonging to the new system software and then writes all received files into the intended storage area in the software storage unit 13. In the case where a partial update process is selected, the updating unit 17 requests the management server 20 to provide difference files relative to the old version system software and then updates the intended storage area in the software storage unit 13 with the received difference files. In the case where a copy & update process is selected, the updating unit 17 first copies all files belonging to some source system software to the intended old version software area within the software storage unit 13. Then the updating unit 17 requests the management server 20 to provide difference files between the source system software and the new system software, and it updates some of the copied files in the old version software area with the received difference files. Subsequently to the above, the updating unit 17 updates some management data stored in the management database 11 to delete the old version information and add a new set of version information for registration of the newly installed system software.

The management server 20, on the other hand, has the following elements: a version management database 21, a system software storage unit 22, a version information sender 23, a difference extractor 24, and a data transfer processor 25. These elements provide the functions and services described below.

The version management database 21 stores version management data describing various versions of system software stored in a system software storage unit 22. The system software storage unit 22 stores multiple sets of system software with different versions, which are used to update the information processing device 10.

The version information sender 23 handles a version information request from the information processing device 10. Specifically, the version information sender 23 consults the version management database 21 to retrieve version information about a specified version of system software. The retrieved version information is then sent back to the information processing device 10.

The difference extractor 24 extracts, upon request from the information processing device 10, differences between specified new and old versions of system software by consulting the system software storage unit 22. This difference files may include the entire set of the new-version system software. The difference files extracted from the system software storage unit 22 are passed to the data transfer processor 25, and the data transfer processor 25 transfers it to the information processing device 10.

Full Update Method

This section and two subsequent sections will give the details of the aforementioned full update, partial update, and copy & update methods, including their procedures and calculation of update processing times. It is assumed in those sections that the software storage unit 13 of the information processing device 10 stores three different versions of system software. The software storage unit 13 therefore reserves system area Sa 13a, system area Sb 13b, and system area Sc 13c for those three versions.

Figure 2:
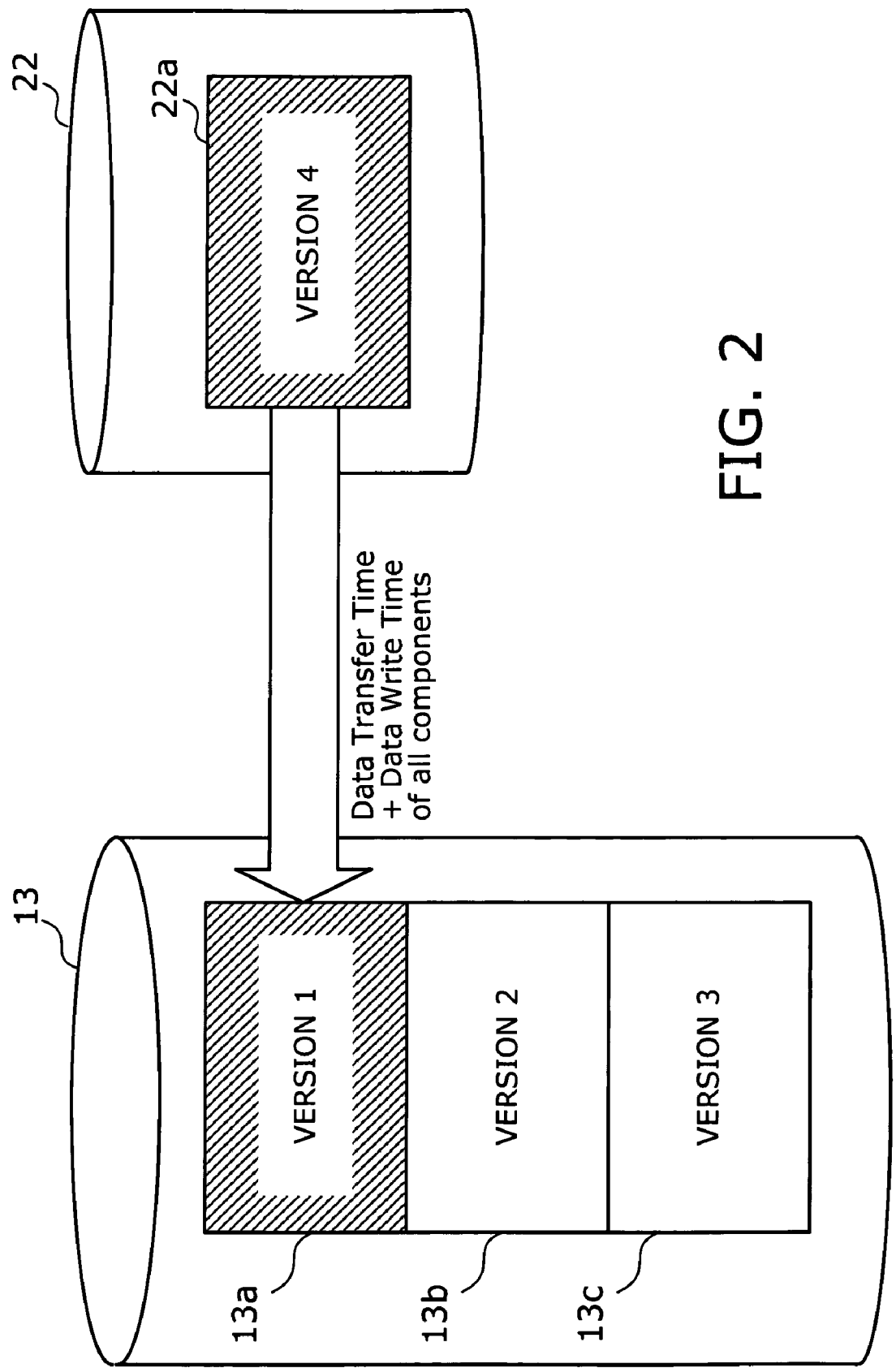
FIG. 2 shows a full update process according to an embodiment of the invention.

FIG. 2 shows a full update process according to an embodiment of the invention. As can be seen from this FIG. 2, the system area Sa 13a accommodates version-1 system software. Likewise, the system area Sb 13b contains version-2 software, and the system area Sc stores version-3 software. Note that the version number is monotonously incremented as the system software is revised. The following example describes an update from version 1 to version 4, the oldest version to the latest version.

According to the full update method, the information processing device 10 requests the management server 20 to provide data of every component belonging to the version-4 system software. The management server 20 responds to this request by sending a full set of component files of version 4. The information processing device 10 then rewrites the system area Sa 13a with the received component files, thus overwriting the existing version-1 system software. The system software is updated in this way from version 1 to version 4.

As can be seen from the above, the update processing time (Tupd1) of a full update process will be a sum of data transfer time and data rewrite time, and Tupd1 is therefore expressed as follows:

$$Tupd1 = Ttx \times SZa + Trw \times SZa \quad (1)$$

where Ttx represents data transfer time per unit size, SZa represents the entire data size, and Trw represents data rewrite time per unit size. Ttx means the data transfer rate of a data link from the management server 20 to the information processing device 10. The time parameter database 12 maintains the value of this Ttx specified as a transfer time parameter (described later). SZa is the total size of components of, in the present context, the version-4 system software. The processing time calculator 15 calculates SZa from version information of the new system software, which is obtained through the version information collector 14. Trw is the time required for the updating unit 17 to write data into the software storage unit 13. The time parameter database 12 maintains the value of this Trw specified as a rewrite time parameter (described later).

The above-described full update process may be faster than a partial update process in the case where the size of difference files, or the number of components, is greater than that of the entire data of new system software.

Partial Update Method

Figure 3:
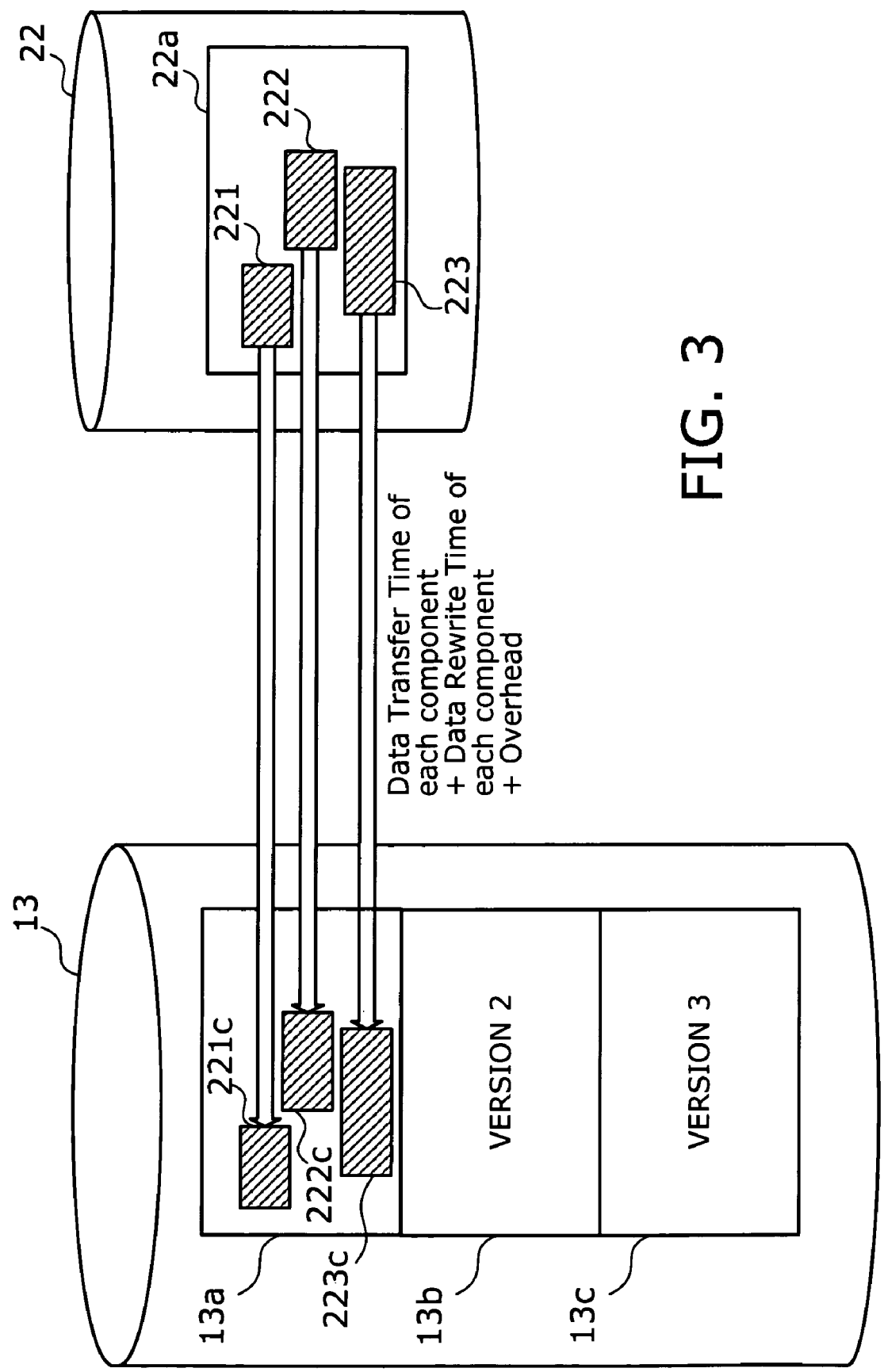
FIG. 3 shows a partial update process according to the present embodiment.

FIG. 3 shows a partial update process according to the present embodiment, in which the elements explained in FIG. 2 bear the same reference numerals. According to the partial update method, an old version of system software is updated by selectively installing revised components. The information processing device 10 interacts with the management server 20 to download version information of the latest version of system software, as well as that of an existing old version to be updated. The information processing device 10 compares those two sets of version information, thus identifying new system components that have different version numbers from their counterparts in the old system software. The information processing device 10 then requests the management server 20 to provide the files of those revised components, and the management server 20 responds to the request by sending the specified component files.

The example of FIG. 3 assumes that three components 221, 222, and 223 have been revised. The information processing device 10 finds this fact and thus requests the management server 20 to send those components. The management server 20 retrieves requested component files from the system software storage unit 22 and sends them back to the information processing device 10. The information processing device 10 updates the contents of the system area Sa 13a from version 1 to version 4 by writing each received component file to its corresponding area 221c, 222c, and 223c.

As can be seen from the above, the update processing time (Tupd2) of a partial update process will be a sum of data transfer time of each component, data rewrite time of each component, and some amount of time overhead, such as a time required to seek locations of files that have to be rewritten. Tupd2 is therefore expressed as follows:

$$Tupd2 = Ttx \times SZd + Trw \times SZd + Toh \quad (2)$$

where Ttx represents data transfer time per unit size, SZd represents difference data size, Trw represents data rewrite time per unit size, and Toh represents time overhead. The difference data size SZd is the data size of difference files between two different versions stored in the management server 20. SZd is calculated as a total size of component files to be updated. Since it only uses those difference files for update, the partial update process is likely to complete the update more quickly than a full update process when the amount of difference files is smaller than the entire files of new system software, or when the number of revised components is smaller than the total number of components.

Copy & Update Method

Figure 4:
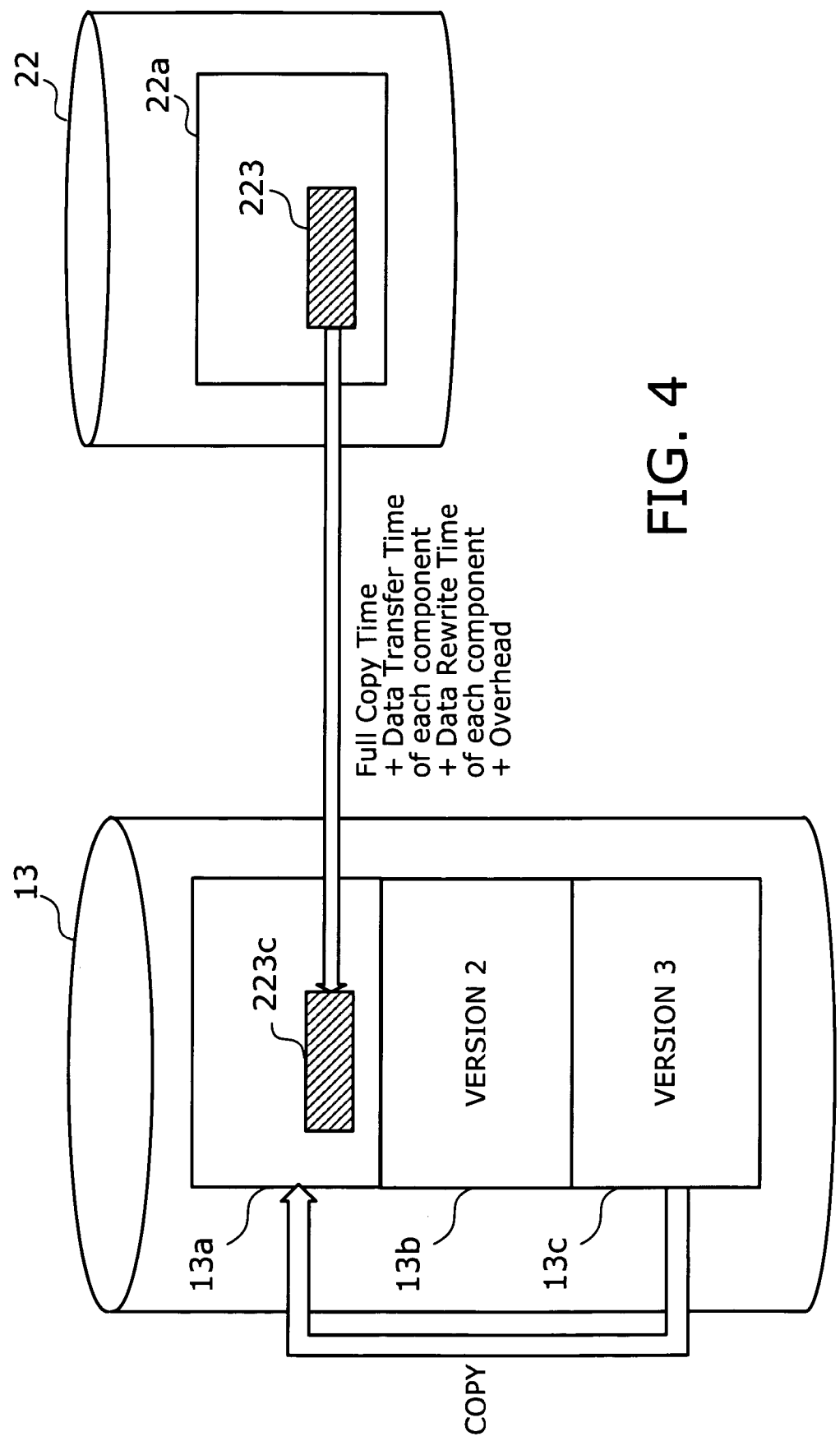
FIG. 4 shows a copy & update process according to the present embodiment.

FIG. 4 shows a copy & update process according to the present embodiment, in which the elements explained in FIG. 2 or 3 bear the same reference numerals. In this copy & update process, the information processing device 10 first scans the software storage unit 13 to find a system software version with the smallest difference from a desired new version (e.g., the latest version 4), based on the version information describing each set of system software. Suppose now that the version 3 has the smallest difference from the latest version, the only difference being a component 223. The information processing device 10 then turns to the system area Sc 13c to read out the version-3 system software identified as the closest version and copies it to the system area Sa 13a currently containing version 1. The information processing device 10 subsequently requests the management server 20 to provide the component 223, the only difference between version 3 and version 4. In response to this request, the management server 20 sends back the specified component 223. The information processing device 10 uses the received component 223 to rewrite its corresponding storage area 223c (a part of the system area Sa 13a), thus accomplishing the update from version 1 to version 4.

As can be seen from the above, the update processing time (Tupd3) of a copy & update process will be a sum of data copy time of an entire set of system software, data transfer time and data rewrite time of each required component, and some amount of time overhead. Tupd3 is therefore expressed as follows:

$$Tupd3 = Tcp \times SZa + Ttx \times SZd + Trw \times SZd + Toh \quad (3)$$

where Tcp represents data copy time per unit size, SZa represents entire data size, Ttx represents data transfer time per unit size, SZd represents difference data size, Trw represents data rewrite time per unit size, and Toh represents a time overhead. Tcp is the internal data transfer rate in the software storage unit 13 to copy data from one portion to another portion. The time parameter database 12 maintains the value of this Tcp specified as a copy time parameter (described later). Generally speaking, an internal copying process within the same device is far quicker than a data transfer process over a network. It is also possible to reduce the number of difference files (revised components) to be transferred, compared to the case of partial update. In terms of update processing times, the copy & update method may therefore be advantageous over the other two update methods in some cases, even though it involves the additional step of copying files.

Update Process Details

Referring back to FIG. 1, this section explains an update process performed by the above-described information processing device 10 and management server 20. Suppose now that the information processing device 10 receives an update command through an appropriate input interface (not shown). This command designates a new version of system software, thus causing the version information collector 14 to request the management server 20 to provide version information about that new version software. Upon receipt of this request, the version information sender 23 in the management server 20 retrieves relevant version information from the version management database 21 for delivery to the information processing device 10. The version information collector 14 receives and forwards the information to the processing time calculator 15.

The processing time calculator 15 calculates update processing times, assuming full update, partial update, and copy & update processes. The full update time is calculated from the data transfer time and rewrite time for handling the entirety of new version software, according to formula (1) described earlier.

The partial update time is calculated from the data transfer time and rewrite time of every component, along with a time overhead, according to formula (2). The processing time calculator 15 can find which components need to be updated by comparing version information of the current version software with that of the new version software, where the former is retrieved from the management database 11 and the latter is downloaded by the version information collector 14.

The copy & update time is calculated, according to formula (3), from the time required to copy a selected version of system software close to the desired new version, a data transfer time and a rewrite time required to update some of the copied components, and a time overhead. The processing time calculator 15 identifies an appropriate source software version by first retrieving version information about every set of system software stored in the software storage unit 13, but other than the one to be updated, and then comparing it with the version information downloaded by the version information collector 14. The processing time calculator 15 also determines which copies of components need further updates by comparing version information about the copy source software with that of the new version software. In the case where the information processing device 10 can allocate only one storage area to store its system software, the calculation of a copy & update time will be omitted.

The process selector 16 compares the full update time, partial update time, and copy & update time (if available) calculated by the processing time calculator 15, thereby choosing the fastest update method. Using the selected update method, the updating unit 17 updates the old-version system software with the specified new version software by rewriting its storage area in the software storage unit 13, thus concluding the update process. Note that the management database 11 is also updated during this process.

Through the update procedure according to the present embodiment, the proposed information processing device 10 calculates update processing times, assuming different update methods that are suitable for different circumstances. The information processing device 10 selects one of those methods that indicates the shortest update processing time and executes specified updates using the selected method. The present embodiment thus enables system software to be updated in the fastest way in any circumstances.

While the above example assumes that components are downloaded from the management server 20, the present invention is not limited to this specific assumption. As an alternative method, the source software components may be stored in a compact disc (CD) or other computer-readable storage media. More specifically, one or more sets of components are recorded previously in predetermined areas of a storage medium, together with their respective component allocation information and version information. The version information collector 14 in the information processing device 10 makes access to an appropriate area of this storage medium to retrieve version information of a new version of software. The processing time calculator 15 calculates update processing times for a full update process, a partial update process, and a copy & update process. This calculation uses read access time parameters of the storage medium in place of data transfer time. Seek time of disc media may be considered as part of the time overhead. The process selector 16 chooses the fastest update method, and the updating unit 17 reads out necessary components from the storage medium, instead of downloading them from the management server 20, to accomplish the update using the selected method. The information processing device 10 can quickly update its system software in this way by using a storage medium containing new version software.

Software Update System

Figure 5:
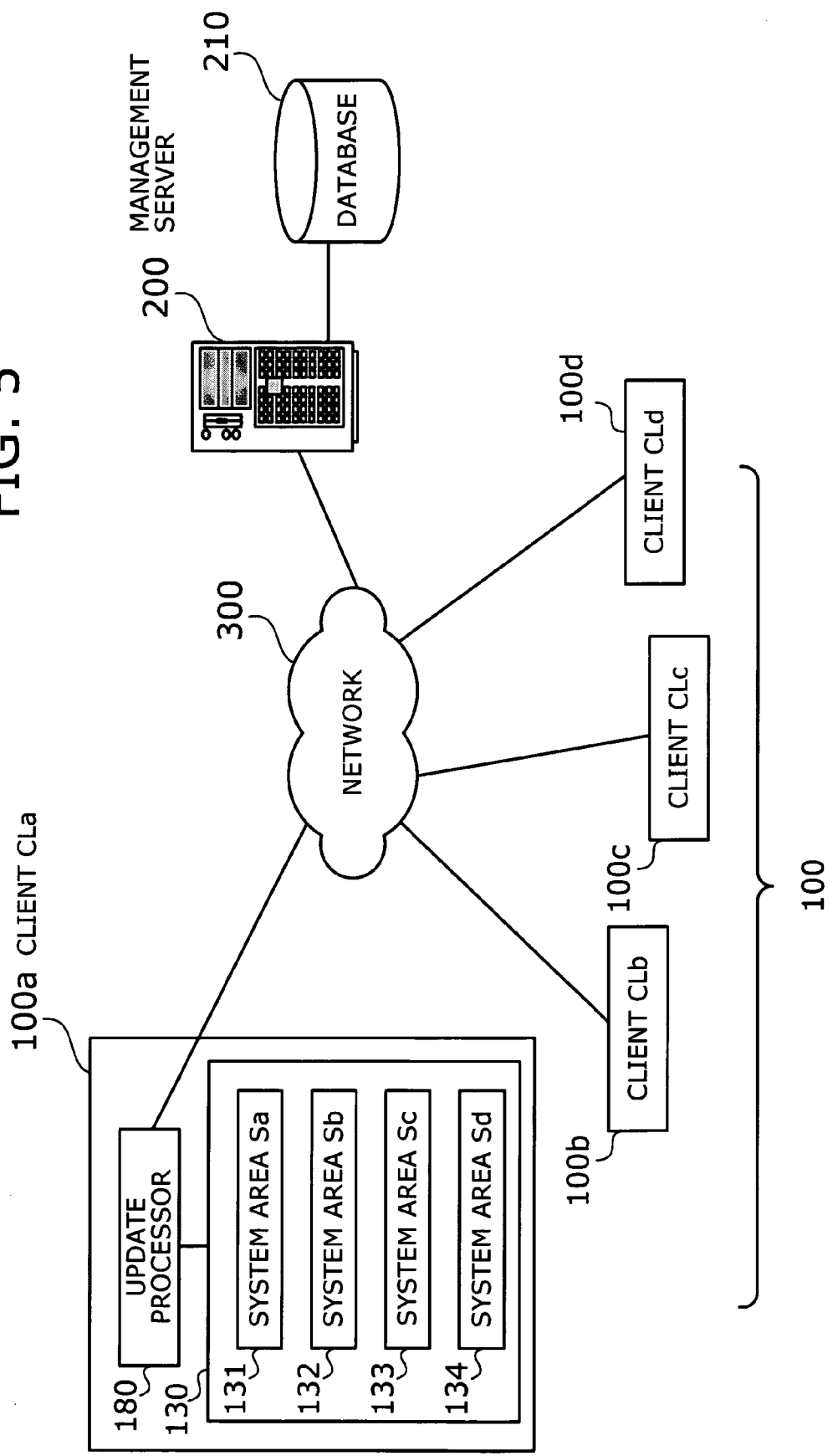
FIG. 5 is a block diagram of a software update system according to the present embodiment.

Referring now to FIG. 5, this section describe a software update system according to an embodiment of the present invention in which a server is provided to support update of software systems in a multiple-client environment. Each client has a plurality of storage areas to store different versions of software and uses them in a selective manner depending on the purpose. FIG. 5 is a block diagram of a client update system according to the present embodiment.

According to the present embodiment, the client update system involves a number of clients 100 and a management server 200 connected over a network 300. The example of FIG. 5 shows only four clients for illustrative purposes, which are: client CLa 100a, client CLb 100b, client CLc 100c, and client CLd 100d. Those clients are collectively referred to by the reference numeral 100. The management server 200 includes, or is coupled to, a database 210 to manage data of various software system versions.

The client CLa 100a has a storage unit 130 storing a plurality of software systems (simply "systems" where appropriate), one of which is selected for its operation. As shown in FIG. 5, the storage unit 130 has four system areas Sa 131, Sb 132, Sc 133, and Sd 134 to accommodate four different versions. The client CLa 100a also has an update processor 180 for performing specific update tasks. When an update command is entered to the client CLa 100a through an input device (not shown), the update processor 180 removes the oldest version of system data from the storage unit 130 and updates its system area with the latest version of system data. The other three clients 100b, 100c, and 100d have the same structure as this client CLa 100a.

The management server 200 manages component files belonging to various versions of software systems stored in the database 210. The clients 100 are allowed to send requests to the management server 200 at any time using a connection over the network 300. The management server 200 responds to those requests by sending, for example, version management information or a requested version of components back to the requesting client.

Client Hardware Platform

Figure 6:
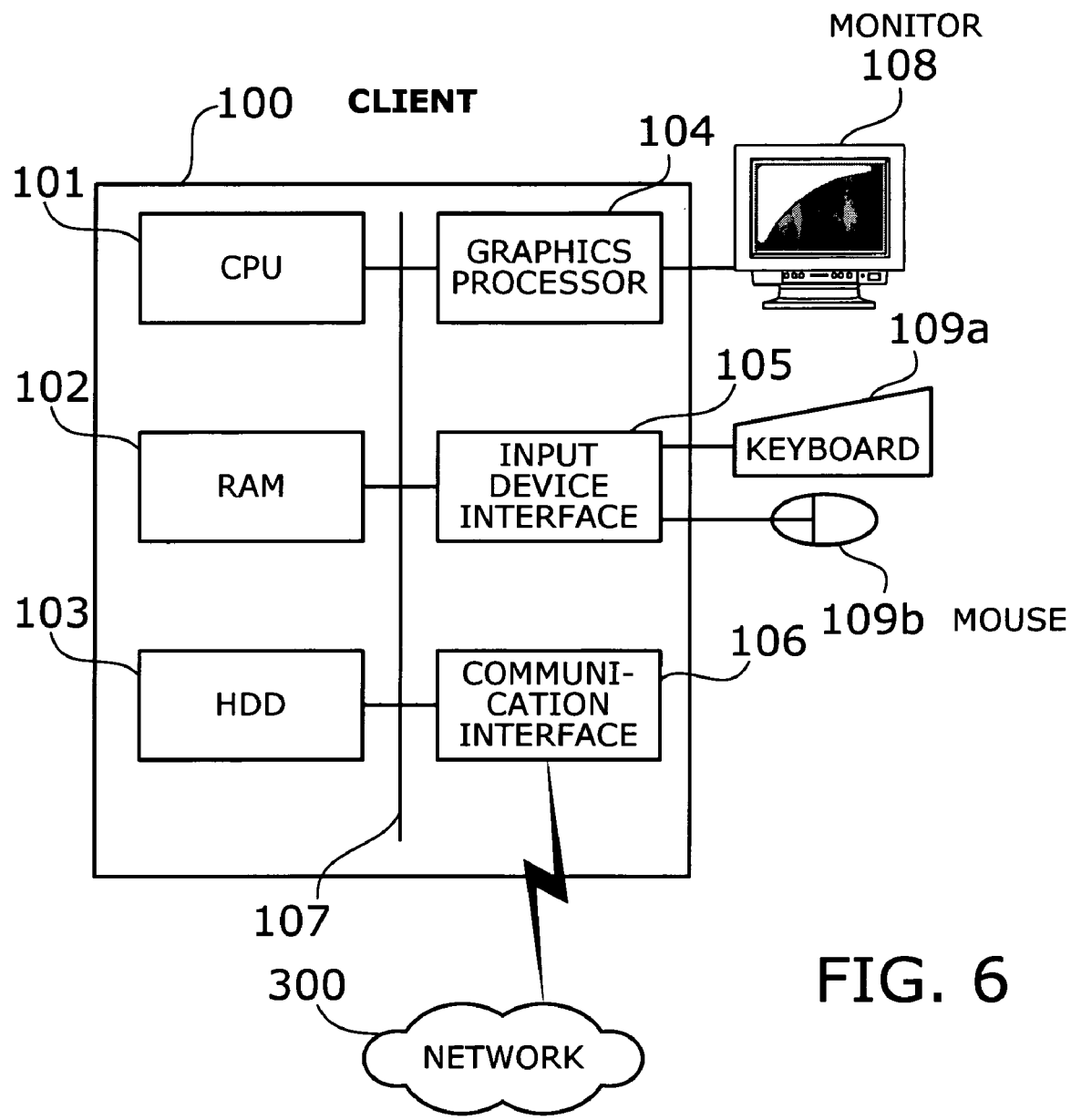
FIG. 6 is a block diagram showing an example hardware configuration of a client according to the present embodiment.

FIG. 6 is a block diagram showing an example hardware configuration of a client 100 according to the present embodiment. The illustrated client 100 has the following functional elements: a central processing unit (CPU) 101, a random access memory (RAM) 102, a hard disk drive (HDD) 103, a graphics processor 104, an input device interface 105, and a communication interface 106. The CPU 101 controls the entire function of the client 100, interacting with other elements via a bus 107.

The RAM 102 serves as temporary storage for the whole or part of operating system (OS) programs and application programs that the CPU 101 executes, in addition to other various data objects manipulated at runtime. The HDD 103 stores OS and application program files. The storage unit 130 storing a plurality of software systems is implemented as part of this HDD 103. The graphics processor 104 produces video images in accordance with drawing commands from the CPU 101 and displays them on the screen of an external monitor 108 coupled thereto. The input device interface 105 is used to receive signals from external input devices, such as a keyboard 109a and a mouse 109b. Those input signals are supplied to the CPU 101 via the bus 107. The input device interface 105 may also be designed to accept signals from a remote controller (not shown) or the like. The communication interface 106 is connected to a network 300, allowing the CPU 101 to exchange data with the management server 200 over the network 300.

The computer described above serves as a hardware platform for realizing the processing functions of the present embodiment. While FIG. 6 illustrates a client platform, the same hardware structure may also be applied to the management server 200.

Client Update Software

Figure 7:
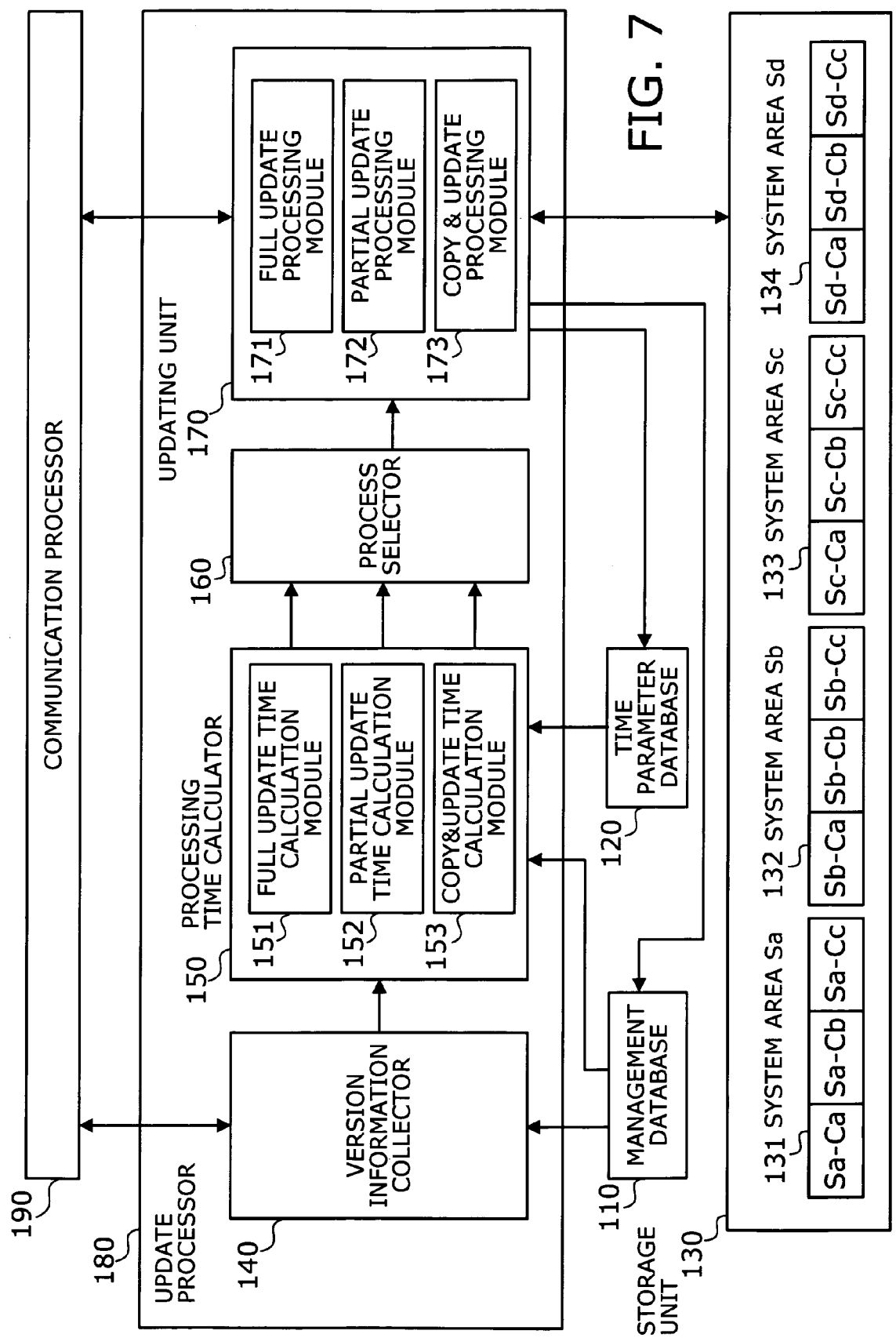
FIG. 7 is a block diagram showing an example software configuration of an update processor in a client according to the present embodiment.

FIG. 7 is a block diagram showing an example software configuration of the update processor 180 in the client 100 according to the present embodiment. Some elements shown in FIG. 7 are common to those found in FIG. 5, as indicated by their consistent reference numerals, and the explanation will not be repeated in this section. FIG. 7 shows details of the update processor 180, along with some related elements including a communication processor 190, a management database 110, a time parameter database 120, and a storage unit 130.

In the illustrated example, the update processor 180 updates the oldest system to the latest version in response to an update command. To achieve this the update processor 180 has the following elements: a version information collector 140, a processing time calculator 150, a process selector 160, and an updating unit 170. To describe those elements briefly, the version information collector 140 collects version information about the latest system from the management server 200. The processing time calculator 150 calculates an update processing time for each different update method. The process selector 160 selects an update method with the shortest update processing time, and the updating unit 170 executes an update using the selected method.

The management database 110 stores management information about software systems stored in the storage unit 130. The time parameter database 120 stores various parameters used in calculating update processing times. The storage unit 130 stores a plurality of different versions of software system in separate storage areas 131 to 134. Each area contains three components designated by the IDs "Ca," "Cb," and "Cc." Referring to FIG. 7, "Sa-Ca" refers to component Ca stored in the system area Sa 131, and "Sa-Cb" refers to component Cb in the system area Sa 131. Similarly "Sa-Cc" refers to component Cc in the same system area Sa 131. The same applies to the other areas: system area Sb 132, system area Sc 133, and system area Sd 134.

The communication processor 190 controls communication between the client 100 and management server 200. Via this communication processor 190, the version information collector 140 sends a request to and receives a response from the management server 200 to obtain version information about the latest system to be installed.

The processing time calculator 150 has a full update time calculation module 151, a partial update time calculation module 152, and a copy & update time calculation module 153 to calculate update processing times, assuming different update methods. The process selector 160 selects the fastest update process based on the update processing times calculated by the processing time calculator 150.

The updating unit 170 provides a full update processing module 171 to perform a full update process, a partial update processing module 172 to perform a partial update process, and a copy & update processing module 173 to perform a copy & update process. According to the decision of the process selector 160, the updating unit 170 activates one of those three modules to execute the update.

Management Data and Time Parameters

This section gives details of management data and time parameters stored in the management database 110 and time parameter database 120, respectively.

FIG. 8 shows example management data maintained in a client according to the present embodiment. The management database 110 stores management data formed from overall system information 401 and area-specific information 402. The overall system information 401 is the information about all software systems that the client 100 maintains. The area-specific information 402, on the other hand, gives details of the software system stored each area of the storage unit 130.

More specifically, the overall system information 401 includes the number of systems installed in the client 100. Also included is the number of components constituting each software system. In the example of FIG. 8, the overall system information 401 indicates that the storage unit 130 contains four generations of systems. It also indicates that each system is formed from three components.

The area-specific information 402 is broadly divided into as many sections as the number of systems, each corresponding to one system area of the storage unit 130. In the example of FIG. 8, there are four sections describing system areas Sa, Sb, Sc, and Sd of the storage unit 130. Specifically, each section of the area-specific information 402 is a collection of parameters including: system version number, component IDs, component version numbers, and component data sizes. The component IDs and subsequent parameters describe the software components belonging to the corresponding system stored in the storage unit 130. More specifically, the first section indicates that the system area Sd contains version-6 system software formed from the following components: version-1 component Ca with a size of 100 KB, version-2 component Cb with a size of 110 KB, and version-5 component Cc with a size of 130 KB. Likewise, the second section indicates that the system area Sc contains version-5 system software formed from the following components: version-1 component Ca with a size of 100 KB, version-2 component Cb with a size of 110 KB, and version-4 component Cc with a size of 120 KB. The third entry indicates that the system area Sb contains version-4 system software formed from the following components: version-1 component Ca with a size of 100 KB, version-1 component Cb with a size of 100 KB, and version-4 component Cc with a size of 120 KB. The fourth entry indicates that the system area Sa contains version-3 system software formed from the following components: version-1 component Ca with a size of 100 KB, version-1 component Cb with a size of 100 KB, and version-3 component Cc with a size of 120 KB.

FIG. 9 shows example time parameters maintained in the time parameter database 120 of a client according to the present embodiment. The time parameters shown in FIG. 9 are divided into three groups: (a) transfer time parameter 411 used to calculate the time required to download some specific data from the management server 200, (b) rewrite time parameters 412 used to calculate the time required to rewrite some specific data in the storage unit 130, and (c) copy time parameter 413 used to calculate the time required to copy some specific data within the storage unit 130.

The transfer time parameter 411 gives a data transfer time per unit size, which is determined from an actual measurement result of data communication with the management server 200. For example, the data transfer time is measured during an update process, and the parameter is calculated from the measured time and the size of that transferred data. The calculated value is set as a transfer time parameter 411 for use in subsequent update processing. An alternative way to determine this parameter is to exchange some dummy data with a prescribed size before starting actual update processing and calculate a parameter from the dummy data size and observed data transfer time.

The rewrite time parameters 412 include a data rewrite time per unit size and a time overhead required for preparation. Those two values are previously defined as fixed, client-specific parameters because they depend on the CPU performance of each client device. In the example of FIG. 9, the data rewrite time per unit size is set to 2.5 s/MB, and the time overhead is set to 1.0 s. To be exact, it would be more appropriate to define the time overhead parameter as a function of the number of components included. The example of FIG. 9, however, gives a fixed value for the time overhead parameter, assuming that its dependency on the component count is relatively small.

The copy time parameters 413 gives a time required to copy data of a unit size. The value is previously defined as a fixed, client-specific parameter because it depends on the CPU performance of each client device, similarly to the rewrite time parameters 412.

Management Server Database

This section gives details of data stored in the management server 200 according to the present embodiment. Shown in FIG. 10 is example version management data maintained in the management server 200. Specifically, the database 210 (see FIG. 5) of the management server 200 stores version management data for the purpose of managing system versions, besides storing component files of each system version. This version management data includes the following two kinds of information: (a) overall system information 421 describing system versions that the management server 200 manages, and (b) version-specific information 422 describing details of each system version.

More specifically, the overall system information 421 shows the number of system generations maintained by the management server 200, the number of currently managed systems, and the number of components constituting each system. According to the example of FIG. 10, the management server 200 maintains seven generations of systems, each formed from three components.

The version-specific information 422 gives the following data items for each managed system version: (a) system version number, (b) component ID, version number, and data size of each component belonging to that version. Specifically, the example of FIG. 10 shows that seven system generations are designated by version numbers, "1" to "7." Each version consists of three components designated by component IDs "Ca" "Cb," and "Cc." This part is similar to the management data in a client 100, which was described earlier in FIG. 8.

System Update Process

Figure 11:
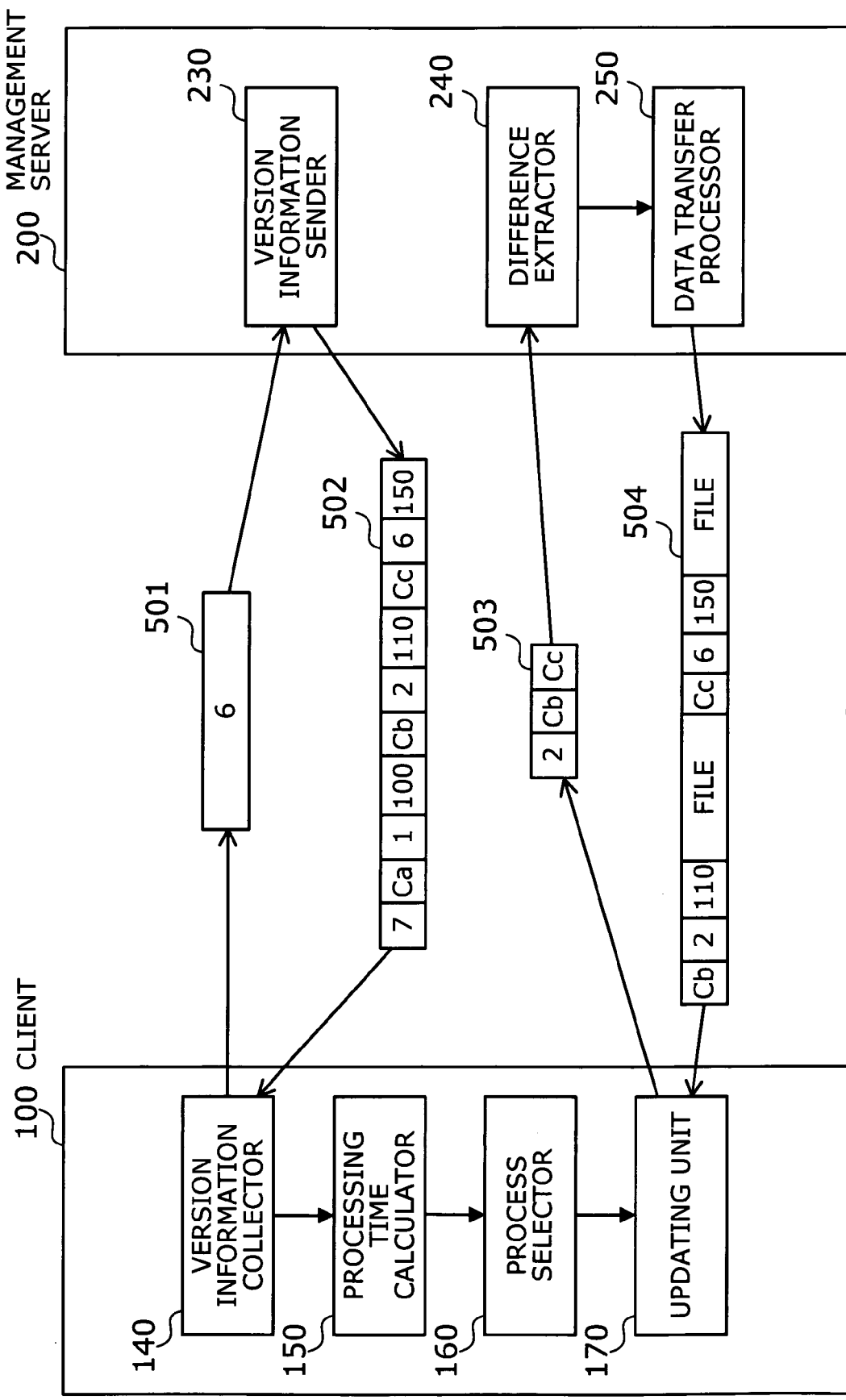
FIG. 11 shows how a client interacts with a management server according to the present embodiment.

This section describes a more specific update process performed by the update system described above. FIG. 11 shows how the client 100 interacts with the management server 200 according to the present embodiment. Some elements in FIG. 11 are common to those shown in FIG. 5, as indicated by their consistent reference numerals, and the explanation will not be repeated in this section. The management server 200 shown in FIG. 11 has a version information sender 230, a difference extractor 240, and a data transfer processor 250, which operate in the same way as the version information sender 23, difference extractor 24, and data transfer processor 25, respectively, described earlier in FIG. 1.

In response to a given update request, the client 100 sends a version information request message 501 from its version information collector 140 to the management server 200 in order to obtain information about the latest system version. To this end, the version information collector 140 consults some pieces of management data (specifically, the area-specific information 402, FIG. 8) stored in the management database 110 in an attempt to find which system version is the latest in the client 100. The version information request message 501 carries the version number that is found, thus informing the management server 200 of the latest system version available in the client 100. It is assumed in the present example that the client's system version number is 6.

Upon arrival of the above version information request message 501 at the management server 200, the version information sender 230 searches the version management data stored in the database 210 to extract version information for the latest version number (version 7 in the present example) out of its corresponding version-specific information 422. The client's system version number indicated in the version information request message 501 may be compared with the latest version number that the management server 200 maintains. If these two version numbers coincide with each other, the version information sender 230 determines that the client 100 owns the latest system, thus notifying the client 100 that there is no need to update. If not, the version information sender 230 returns a latest version information message 502 containing the latest version information available in the management server 200. The latest version information message 502 in the present example carries version information describing the version-7 system software. Specifically, it begins with the latest system version number 7, which is followed by specific values of component ID, version number, and data size of each component (i.e., version=1 and size=100 KB for component Ca, version=2 and size=110 KB for component Cb, and version=6 and size=150 KB for component Cc).

Upon receipt of the latest version information message 502 described above, the client 100 designates the system area Sa as a target update area, meaning that the oldest system version 3 in that area will be replaced with the latest system. The processing time calculator 150 then estimates processing times required for full update, partial update, and copy & update processes. The process selector 160 then chooses the fastest update process from among the three processes, based on the calculation result.

More specifically, referring to FIG. 11, the processing time calculator 150 operates as follows. First, in the case of full update, the processing time calculator 150 first looks into the latest version information message 502 to sum up the size of every component that constitutes the latest version software. In the example of FIG. 11, three components Ca, Cb, and Cc of the version-7 software are 100 KB, 110 KB, and 150 KB in size, respectively. The total data therefore amounts to 360 KB. The processing time calculator 150 then substitutes the calculated total data size into formula (1), together with the data transfer time per unit size specified in the transfer time parameter 411 (FIG. 9) and the data rewrite time per unit size specified in the rewrite time parameters 412 (FIG. 9), thus estimating a full update time.

In the case of partial update, the processing time calculator 150 first retrieves version information about version 3 (i.e., the old version to be replaced with a new version) from the management database 110. The processing time calculator 150 compares each component's version number shown in the retrieved version information with that of the corresponding latest component (i.e., version-7 system component) indicated in the latest version information message 502. This comparison reveals that components Cb and Cc have been updated. The processing time calculator 150 thus substitutes the data sizes of those components Cb and Cc into formula (2), along with the data transfer time per unit size specified in the transfer time parameter 411 and the data rewrite time per unit size and time overhead specified in the rewrite time parameters 412, thus estimating a partial update time.

In the case of copy and update, the processing time calculator 150 first seeks an appropriate source system from among all systems stored in the management database 110 of the client 100. Specifically, in an attempt to find the most similar system, the processing time calculator 150 compares the version number of each existing component with that of the corresponding latest system component (i.e., version-7 system component) indicated in the latest version information message 502. In the present example, the version-6 system stored in the system area Sd is different from the latest system only in their component Cc, as is the version-S system stored in the system area Sc. This means that there are two candidates with comparable similarities. In such a case, the processing time calculator 150 selects one of those candidates according to an appropriate rule previously defined as necessary, depending on the circumstances of system software. For example, the rule may be defined such that a newer version be selected. If this is the case, then the version-6 system will be selected. Or alternatively, the rule may be defined to select a version with a smaller amount of data to be copied. In that case, the version-5 system will be selected. The processing time calculator 150 calculates the time required to copy the selected version of system software, from its overall data size and a given data copy time parameter. The result of this calculation gives the first half of formula (3). The processing time calculator 150 further calculates the second half of formula (3) (i.e., the time required to download component Cc) in the same way as in the case of partial update.

The process selector 160 compares the update processing times calculated above, thereby determining which update process is the fastest. Suppose, for example, that the process selector 160 chooses a partial update process as being the fastest way. The updating unit 170 then performs an update using the selected process. In the present context, the updating unit 170 initiates a partial update process by sending a difference request message 503 to the management server 200, thus requesting necessary components. More specifically, since the client 100 needs two components, Cb and Cc in this case, the difference request message 503 specifies the number (2) of necessary components, as well as their respective IDs ("Cb" and "Cc").

While the present example assumes a partial update process, the process selector 160 may select a full update process instead. In that case, the updating unit 170 requests the management server 200 to provide all components (i.e., components Ca, Cb, and Cc) as difference files. Or, in the case where the process selector 160 selects a copy and update process, the updating unit 170 requests the management server 200 to provide component Cc as the only difference file, after writing source system files over the target system area Sa.

The above difference request message 503 is received by the difference extractor 240 in the management server 200. The difference extractor 240 parses the received message and retrieves requested component files from the database 210. The retrieved files are attached to a difference message 504 and sent back to the requesting client 100 through the data transfer processor 250. This difference message 504 contains the component ID, version, size, and file of each requested component. Upon receipt of this difference message 504, the updating unit 170 in the client 100 updates target components with the component files contained in the received message. The updating unit 170 also updates corresponding management data in the management database 110.

Through the above-described procedure, the client 100 updates its system software, interacting with the management server 200. As can be seen, the present embodiment of the invention permits the client 100 to complete the task in the shortest time.

Client Process Flow

Figure 12:
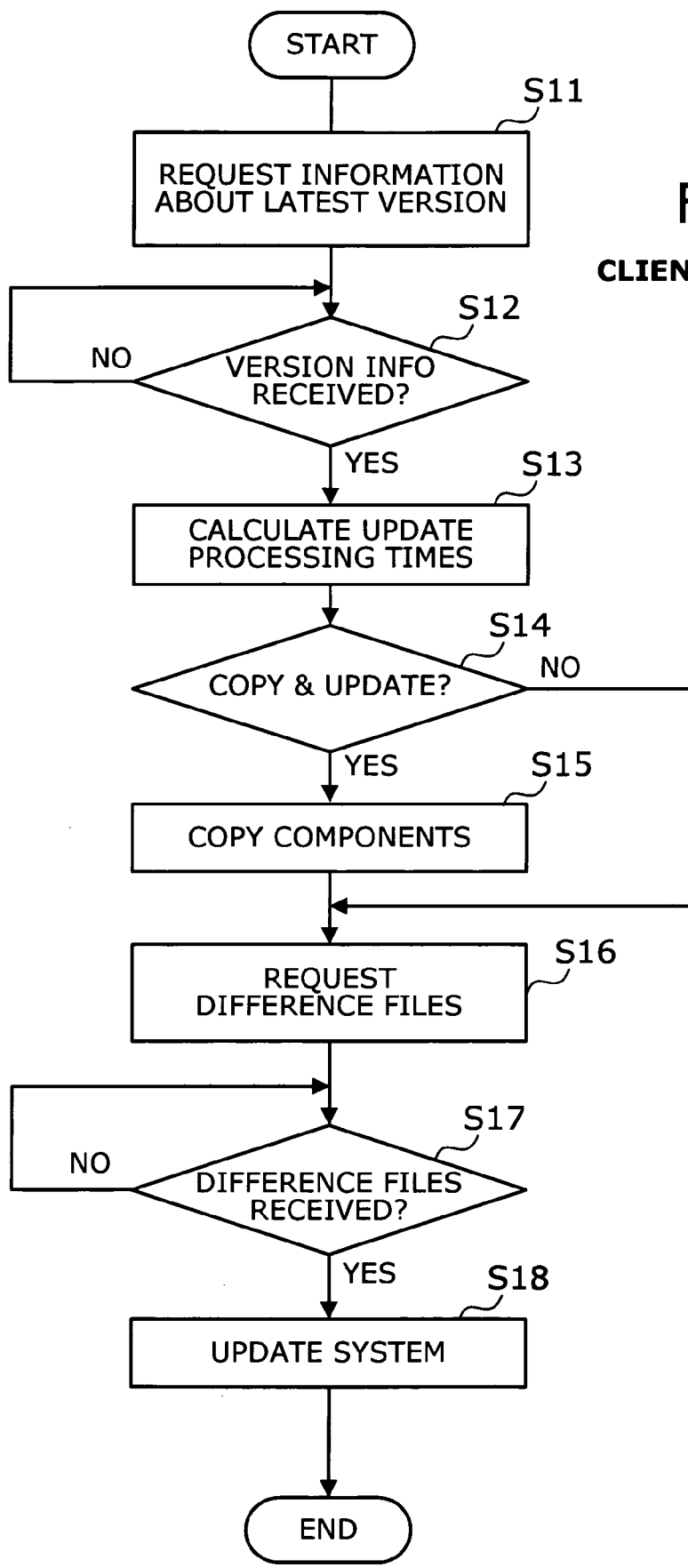
FIG. 12 is a flowchart of update processing performed by a client according to the present embodiment.

This section describes how a client 100 works to execute a requested update according to the present embodiment. FIG. 12 is a flowchart of update processing performed by a client 100. A command requesting a software update to the latest version causes the client 100 to begin executing the following steps:

(Step S11) The client 100 requests the management server 200 to provide information about the latest version by sending a version information request message 501 together with the version number of an existing system to be replaced. The selection of which system to replace is based on a predetermined rule. For example, the client 100 may select the oldest version at that moment. Alternatively, the user may be allowed to specify the version when he/she enters an update command.

(Step S12) The client 100 waits for the management server 200 to respond to the version information request message 501. When the management server 200 returns a latest version information message 502, the client 100 advances to step S13.

(Step S13) Upon receipt of a latest version information message 502, the client 100 extracts latest version information from the received message. The client 100 uses the extracted information, together with management data and time parameters concerning system files maintained in the client 100 itself, to calculate update processing times for different update methods. Specifically, the processing time of a full update process is calculated using formula (1), based on the overall data size of components included in the latest version. The processing time of a partial update process is calculated using formula (2), based on difference files between the latest version and the existing version to be replaced with the latest version. Here the difference files can be identified by consulting the latest version information and management data. The processing time of a copy and update process is calculated using formula (3), based on the difference files between the latest version and a source version to be copied. Here the source version is determined by consulting the latest version information and management data.

(Step S14) The client 100 selects the fastest update method by comparing the update processing times calculated at step S13. If the copy & update method is selected, the client 100 proceeds step S15. Otherwise, it goes to step S16.

(Step S15) Now that copy & update is selected, the client 100 copies system files of the source version to the storage area of the existing version that has been determined at step S11.

(Step S16) The client 100 compiles and sends a difference request message 503 to the management server 200, thereby requesting difference files containing components necessary for update. In the case of full update, the difference files include every component of the latest version software. In the case of partial update, the difference files include latest version components that are different from the existing version to be updated. In the case of copy & update, the difference files include latest version components that are different from the copied version.

(Step S17) The client 100 waits for the management server 200 to respond to the difference request message 503. When the management server 200 returns a difference message 504 containing difference files, the client 100 advances to step S18.

(Step S18) The client 100 updates the storage area of the existing system version by using the difference message 504 received at step S17.

According to the above-described processing steps, the client 100 calculates an update processing time for each different update method, selects the fastest update method, and executes a requested update using that method.

Server Process Flow

This section describes how the management server 200 operates to execute a requested update according to the present embodiment. FIG. 13 is a flowchart of update processing performed by the management server 200 according to the present embodiment. The management server 200 handles request messages from a client 100 as follows:

(Step S21) When a request message is received from a client 100, the management server 200 determines whether the message is a version information request message 501 (see FIG. 11) demanding version information about the latest system version. If so, the management server 200 advances to step S22. Otherwise, the management server 200 branches to step S23.

(Step S22) Now that the received message has turned out to be a version information request message, the management server 200 retrieves version information about the latest system version from its database 210. The management server 200 compiles a latest version information message 502 (FIG. 11), sends it back to the client 100, and exits from the present process. If the requesting client 100 appears to have the latest version, the management server 200 notifies the client 100 that there is no need to update.

(Step S23) Since the received message is not a version information request message 501, the management server 200 then determines whether the request message is a difference request message 503 (FIG. 11). If so, the management server 200 advances to step S24. Otherwise, the management server 200 exits from the present process.

(Step S24) Now that the received message has turned out to be a difference request message 503, the management server 200 extracts component files specified as required difference files. In the case of full update, the management server 200 collects every component file of the latest version as the difference request message 503 simply specifies that a full set of components be provided, instead of designating selected components. The management server 200 then puts those component files into a difference message 504 and sends it back to the client 100, thus completing the present session.

The management server 200 performs the above-described processing steps, thus permitting the client 100 to receive desired software components. As can be seen from the above, it is the role of clients 100 to determine which difference files are needed for update and which update method should be used. The management server 200 has only to extract and send specified files. Since the management server 200 is supposed to handle requests from many clients 100 as shown in FIG. 5, too much load imposed on the management server 200 would delay the update processing at the clients 100. The present embodiment alleviates the burden on the management server 200 by entrusting selection of difference files and many other tasks to clients 100.

Program Storage Media

The above-described processing mechanisms of the present invention are actually be implemented on a computer system, the instructions being encoded and provided in the form of computer programs. A computer system executes such programs to provide the intended functions of the present invention. For the purpose of storage and distribution, the programs may be stored in a computer-readable medium. Suitable computer-readable storage media include magnetic storage media, optical discs, magneto-optical storage media, and solid state memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which case several master program files are made available on a server computer for downloading to other computers via a network.

A user computer stores necessary software components in its local storage unit, which have previously been installed from a portable storage media or downloaded from a server computer. The computer executes the programs read out of the local storage unit, thereby performing the programmed functions. As an alternative way of program execution, the computer may execute programs by reading out their instruction codes directly from a portable storage medium. Another alternative method is that the user computer dynamically downloads programs from a server computer when they are demanded and executes them upon delivery.

CONCLUSION

As can be seen from the above sections, the computer program and apparatus according to the present invention calculates an update processing time for each different processing method that can be used to update old version software stored in an information processing device. The fastest update processing method is then selected and executed, taking into consideration that the actual update processing time may vary depending on the size of transferred data, the time required for data transfer, the time required to write data in a software storage area, and other factors related to the system environment. This feature of the present invention enables information processing devices to update installed software in a minimum time.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for updating installed software, comprising:
   (a) a memory that stores different versions of software, including old version software to be updated and intermediate version software that is newer than the old version software; and
   (b) a processor to execute a process comprising:
   obtaining version information describing specified new version software;
   calculating a full update time, a partial update time, and a copy and update time, based on the obtained version information describing the new version software and version information describing the old version software:
   the full update time being a time required for a full update process that rewrites the old version software entirely with the new version software,
   the partial update time being a time required for a partial update process that updates the old version software by using a first set of difference files, and
   the copy and update time being a time required for a copy and update process that first copies the intermediate version software to a storage area accommodating the old version software and then updates the copied intermediate version software to the new version software by using a second set of difference files;
   selecting a fastest update process from among the full update process, partial update process, and copy and update process by comparing the calculated full update time, partial update time, and copy and update time with each other; and
   executing the selected fastest update process to update the old version software to the new version software.

2. The apparatus according to claim 1, wherein:
   (a) the processor calculates the full update time as a sum of:
   a time required to transfer entire files of the new version software from a source location thereof to the apparatus, and
   a time required to rewrite an area of the old version software with the transferred files of the new version software;
   (b) the processor calculates the partial update time as a sum of:
   a time required to transfer the first set of difference files from a source location thereof to the apparatus,
   a time required to rewrite part of the old version software with the transferred first set of difference files, and
   a time overhead related to the rewriting of the old version software, including a time required to seek locations of files to be rewritten; and
   (c) the processor calculates the copy and update time as a sum of:
   a time required to copy the intermediate version software to the storage area accommodating the old version software,
   a time required to transfer the second set of difference files from a source location thereof to the apparatus,
   a time required to rewrite part of the copied intermediate version software with the transferred second set of difference files, and
   a time overhead related to the rewriting of the intermediate version software, including a time required to seek locations of files to be rewritten.

3. The apparatus according to claim 1, wherein:
   each version of software is formed from a plurality of components;
   version information describing a specific version of software includes version numbers of individual components belonging to that specific version of software; and
   the processor compiles the first set and second set of difference files by comparing the components of the new version software with corresponding components of the old version software or intermediate version software, respectively, based on the version information describing the new version software, as well as based on the version information describing the old version software or intermediate version software.

4. The apparatus according to claim 3, wherein the processor selects, as the intermediate version software, one version of software that bears a resemblance to the new version software in terms of component versions, by comparing the version information of the new version software with the version information of other versions stored in the memory.

5. The apparatus according to claim 1, wherein:
   the apparatus is connected to a management server through a network, the management server serving as a source location of the new version software and version information thereof;
   the processor receives the version information about the new version software from the management server, in response to a version information request sent to the management server;
   the processor calculates the full update time, partial update time, and copy and update time, assuming that the new version software and the first and second sets of difference files are to be downloaded from the management server over the network; and
   the updating unit executes the selected fastest update process by using:
   the entire new version software downloaded from the management server when the processor has selected a full update process,
   the first set of difference files downloaded from the management server when the processor has selected a partial update process, or
   the second set of difference files downloaded from the management server when the processor has selected a copy and update process.

6. The apparatus according to claim 5, wherein the processor calculates the full update time as a sum of:
- a time required to download entire files of the new version software from the management server over the network; and
- a time required to rewrite an area of the old version software with the downloaded files of the new version software.

7. The apparatus according to claim 5, wherein:
- each version of software is formed from a plurality of components;
- version information describing a specific version of software includes version numbers of individual components belonging to that specific version of software;
- the processor identifies the components of the new version software whose version numbers are different from those of corresponding components of the old version software; and
- the processor calculates the partial update time as a sum of:
- a time required to download the identified components from the management server over the network,
- a time required to rewrite relevant part of the old version software in the memory with the downloaded components, and
- a time overhead related to the rewriting of the old version software.

8. The apparatus according to claim 5, wherein:
- each version of software is formed from a plurality of components;
- version information describing a specific version of software includes version numbers of individual components belonging to that specific version of software;
- the processor identifies components of the new version software whose version numbers are newer than those of corresponding components of the intermediate version software; and
- the processor calculates the copy and update time as a sum of:
- a time required to copy the intermediate version software to a storage area accommodating the old version software,
- a time required to download the identified components from the management server over the network,
- a time required to rewrite part of the copied intermediate version software in the memory with the downloaded components, and
- a time overhead related to the rewriting of the copied intermediate version software.

9. The apparatus according to claim 5, wherein the processor calculates the times required for downloading from the management server, based on either of:
- an actual data transfer performance of the network that was measured at a previous update process; and
- an actual data transfer performance of the network that is measured by sending dummy data before the processor begins to calculate the required times.

10. The apparatus according to claim 5, wherein:
- the processor attaches information about a software version that is currently the latest in the memory to the version information request to be sent to the management server;
- the management server notifies the apparatus of whether the software version indicated in the attached information needs an update; and
- the processor stops initiating an update process if the notification from the management server indicates no need for update.

11. A non-transitory computer-readable storage medium storing a computer program for use by a computer to update installed software, the computer having a software storage unit storing different versions of software including old version software to be updated and intermediate version software that is newer than the old version software, the computer program causing the computer to function as:
- (a) a version information collector that obtains version information describing specified new version software;
- (b) a processing time calculator that calculates a full update time, a partial update time, and a copy and update time, based on the obtained version information describing the new version software and version information describing the old version software, wherein:
- the full update time is a time required for a full update process that rewrites the old version software entirely with the new version software,
- the partial update time is a time required for a partial update process that updates the old version software by using a first set of difference files, and
- the copy and update time is a time required for a copy and update process that first copies the intermediate version software to a storage area accommodating the old version software and then updates the copied intermediate version software to the new version software by using a second set of difference files;
- (c) a process selector that selects a fastest update process from among the full update process, partial update process, and copy and update process by comparing the calculated full update time, partial update time, and copy and update time with each other; and
- (d) an updating unit that executes the selected fastest update process to update the old version software to the new version software.

12. The non-transitory computer-readable storage medium according to claim 11, wherein:
- (a) the processing time calculator calculates the full update time as a sum of:
- a time required to transfer entire files of the new version software from a source location thereof to the apparatus, and
- a time required to rewrite an area of the old version software with the transferred files of the new version software;
- (b) the processing time calculator calculates the partial update time as a sum of:
- a time required to transfer the first set of difference files from a source location thereof to the apparatus,
- a time required to rewrite part of the old version software with the transferred first set of difference files, and
- a time overhead related to the rewriting of the old version software, including a time required to seek locations of files to be rewritten; and
- (c) the processing time calculator calculates the copy and update time as a sum of:
- a time required to copy the intermediate version software to the storage area accommodating the old version software,
- a time required to transfer the second set of difference files from a source location thereof to the apparatus,
- a time required to rewrite part of the copied intermediate version software with the transferred second set of difference files, and
- a time overhead related to the rewriting of the intermediate version software, including a time required to seek locations of files to be rewritten.

13. The non-transitory computer-readable storage medium according to claim 11, wherein:
   each version of software is formed from a plurality of components;
   version information describing a specific version of software includes version numbers of individual components belonging to that specific version of software; and
   the processing time calculator compiles the first set and second set of difference files by comparing the components of the new version software with corresponding components of the old version software or intermediate version software, respectively, based on the version information describing the new version software, as well as based on the version information describing the old version software or intermediate version software.

14. The non-transitory computer-readable storage medium according to claim 13, wherein the processing time calculator selects, as the intermediate version software, one version of software that bears a resemblance to the new version software in terms of component versions, by comparing the version information of the new version software with the version information of other versions stored in the software storage unit.

15. The non-transitory computer-readable storage medium according to claim 11, wherein:
   the computer is connected to a management server through a network, the management server serving as a source location of the new version software and version information thereof;
   the version information collector receives the version information about the new version software from the management server, in response to a version information request sent to the management server;
   the processing time calculator calculates the full update time, partial update time, and copy and update time, assuming that the new version software and the first and second sets of difference files are to be downloaded from the management server over the network; and
   the updating unit executes the selected fastest update process by using:
   the entire new version software downloaded from the management server when the process selector has selected a full update process,
   the first set of difference files downloaded from the management server when the process selector has selected a partial update process, or
   the second set of difference files downloaded from the management server when the process selector has selected a copy and update process.

16. The non-transitory computer-readable storage medium according to claim 15, wherein the processing time calculator calculates the full update time as a sum of:
   a time required to download entire files of the new version software from the management server over the network; and
   a time required to rewrite an area of the old version software with the downloaded files of the new version software.

17. The non-transitory computer-readable storage medium according to claim 15, wherein:
   each version of software is formed from a plurality of components;
   version information describing a specific version of software includes version numbers of individual components belonging to that specific version of software;
   the processing time calculator identifies the components of the new version software whose version numbers are different from those of corresponding components of the old version software; and
   the processing time calculator calculates the partial update time as a sum of:
   a time required to download the identified components from the management server over the network,
   a time required to rewrite relevant part of the old version software in the software storage unit with the downloaded components, and
   a time overhead related to the rewriting of the old version software.

18. The non-transitory computer-readable storage medium according to claim 15, wherein:
   each version of software is formed from a plurality of components;
   version information describing a specific version of software includes version numbers of individual components belonging to that specific version of software;
   the processing time calculator identifies components of the new version software whose version numbers are newer than those of corresponding components of the intermediate version software; and
   the processing time calculator calculates the copy and update time as a sum of:
   a time required to copy the intermediate version software to a storage area accommodating the old version software,
   a time required to download the identified components from the management server over the network,
   a time required to rewrite part of the copied intermediate version software in the software storage unit with the downloaded components, and
   a time overhead related to the rewriting of the copied intermediate version software.

19. The non-transitory computer-readable storage medium according to claim 15, wherein the processing time calculator calculates the times required for downloading from the management server, based on either of:
   an actual data transfer performance of the network that was measured at a previous update process; and
   an actual data transfer performance of the network that is measured by sending dummy data before the processing time calculator begins to calculate the required times.

20. The non-transitory computer-readable storage medium according to claim 15, wherein:
   the version information collector attaches information about a software version that is currently the latest in the software storage unit to the version information request to be sent to the management server;
   the management server notifies the computer of whether the software version indicated in the attached information needs an update; and
   the version information collector stops initiating an update process if the notification from the management server indicates no need for update.

* * * * *